May 6, 1958  P. L. REYNOLDS  2,833,577
SCRAPER SEAL
Filed Dec. 24, 1956

INVENTOR.
Percival L. Reynolds,
BY
Cromwell, Greist & Warden
Attys

United States Patent Office 2,833,577
Patented May 6, 1958

2,833,577
SCRAPER SEAL

Percival L. Reynolds, Glenview, Ill., assignor to Chicago Rawhide Manufacturing Company, Chicago, Ill., a corporation of Illinois Application December 24, 1956, Serial No. 630,373

7 Claims. (Cl. 288—3)

The present invention relates generally to a new and improved form of radially acting seal for use with a shaft to which is imparted at least some reciprocating action. More particularly, the present invention is directed to a new and improved form of seal for use with a reciprocating shaft, the seal being capable of providing flexible rotary or reciprocating sealing action along the peripheral surface of a shaft and being further capable of providing resilient scraping action along the surface of the shaft.

Scraper elements have been found desirable for use in conjunction with reciprocating pistons for the purpose of removing deposits of foreign material, such as carbonized oil, to keep the peripheral surface of the piston clean for efficient operation. Different forms of scraper units have been used wherein segmental convolutions of resilient metallic material are positioned around a piston in contact with the outer periphery thereof. The resiliency of the metallic material allows the scraper unit to be expandably held in engagement with the periphery of the piston in order to establish proper scraping action for the removal of foreign deposits on the piston and thus prevent the possibility of the piston sticking or otherwise operating inefficiently. Scraping action of this type is not only desirable in connection with maintaining efficient operation of pistons, but in line with the purposes of the present invention it has also been found desirable in connection with its use with shafts to which there is imparted at least a certain degree of reciprocating action. In the instance of the use of a scraper unit with a shaft, an additional problem is present which concerns the proper mounting of the scraper unit to compensate for eccentric operation of the shaft.

It is an object of the present invention to provide a new and improved combined radially acting oil seal and scraper unit adapted for use with both a piston or shaft to which there is imparted at least a degree of reciprocating movement.

A further object is to provide a new and improved combined radially acting oil and scraper seal wherein the scraper ring unit is cooperatively mounted with the resilient material of the oil seal to provide compensating action in the operation of the scraper ring unit for eccentric movement of the shaft or piston under seal.

An additional object taken in conjunction with the foregoing is to provide a new and improved combinedly acting scraper and oil seal of the type described wherein the oil seal mounting and rigidifying members additionally function to mount and properly position the scraper ring unit, and the scraper ring unit is resiliently backed up by the material of the oil seal to impart additional utility to the over-all sealing unit so as to allow its use not only with concentrically operating pistons but also with eccentrically reciprocating shafts.

Other objects not specifically set forth will become apparent from the following detailed description made in conjunction with the drawings wherein.

Figure 1:
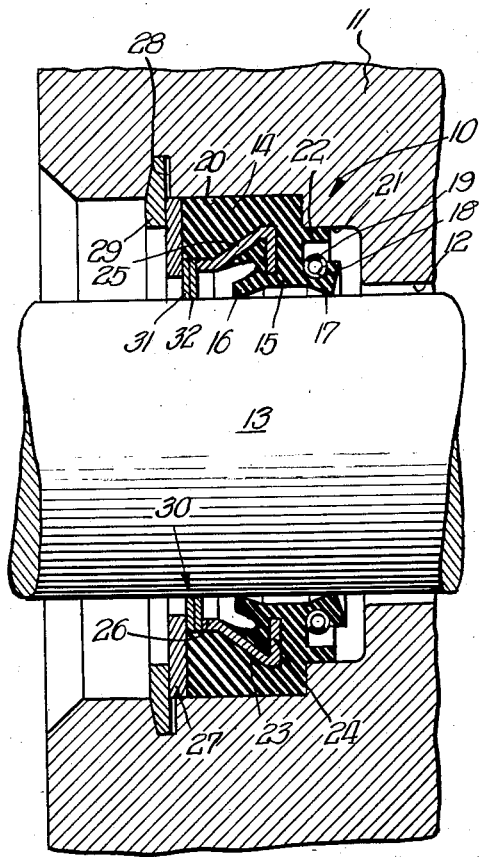
Fig. 1 is a partial vertical section of a shaft assembly having mounted therein one form of the new and improved scraper seal of the present invention.

In Fig. 1 a combined scraper and oil seal unit 10 is illustrated mounted within a shaft housing or piston cylinder 11 having an annular bore 12 through which a reciprocating piston or shaft 13 is received. The seal 10 is formed from resilient rubber or rubber-like material and is provided with an axially directed annular block-like body portion 14. One end of the body portion 14 is integrally formed with a sealing lip portion 15 formed from the same material and provided with oppositely directed flexible sealing lips 16 and 17. The sealing lips 16 and 17 are substantially axially directed while being inclined toward the piston or shaft 13 in resiliently flexible sealing engagement with the outer periphery thereof. The sealing lip 16 is of generally rectangular outline in cross section while the sealing lip 17 is provided with a substantially radially directed portion defining a groove 18 with the adjacent radial end margin of the body portion 14 in which a continuous coil spring 19 is received and held.

The outer periphery of the body portion 14 and the outer portion of the radial end surface of the same in association with the sealing lip portion 15 are received within an enlarged annular bore 20 of the housing 11. The enlarged bore 20 communicates with a bore 21 of reduced diameter in which in overlapping relation is received an annular rib 22 formed integral with the radial end face of the body portion 14 in association with the sealing lip portion 15. Engagement between the outer periphery of the body portion 14 and the outer periphery of the annular rib 22, as well as the outer radial end face of the body portion 14, with the stepped surfaces of the bores 20 and 21 provides the seal 10 throughout the flexible portion of the same with rigid support for establishing efficient sealing action relative to the shaft or piston 13.

To adequately internally rigidify the resilient material of the seal 10, a ring-like member 23 is substantially imbedded within the material of the body portion 14 and the sealing lip portion 15. The rigidifying ring-like member 23 is formed from a radially inwardly directed portion 24 extending from the interior of the body portion 14 into the interior of the sealing lip portion 15. Integral with the radially inwardly directed portion 24 is an inclined center portion 25 imbedded in the body portion 14 of the seal 10 and integrally connected at its innermost end with an axially extending portion 26, the inner periphery and radial end margin of which are exposed along the inner periphery of the body portion 14 just short of the radial end margin of the same opposite the end integrally formed with the sealing lip portion 15.

The radial end margin of the body portion 14 which is removed from the sealing lip portion 15 is in intimate contact with a radially directed flat holding ring 27, the outer diameter of which is receivable within the bore 20 and the inner diameter of which is substantially greater than the diameter of the shaft or piston 13. The bore 20 of the housing 11 is provided with a radially inwardly opening circumferentially continuous groove 28 in which is received a split ring 29 in engagement with the outer surface of the flat ring 27 to hold the same in contact with the adjacent end margin of the body portion 14 and hold the seal 10 in its mounted condition within the housing 11. The flat ring 27 may be bonded to the adjacent radial end surface of the body portion 14 if desired.

In combination with the flexible sealing lips 16 and 17 which seal the shaft or piston 13, the seal 10 is provided with a scraper ring generally designated by the numeral 30. Referring to Figs. 3, the scraper ring 30 is formed from integrally connected, non-continuous ring elements 31 and 32 which are coiled upon one another to form a helical segment of slightly less than two full tightly wound, contacting convolutions. For descriptive purposes the scraper ring 30 has been designated as being formed from integrally joined non-continuous ring elements 31 and 32, although it should be understood that the scraper ring unit 30 is a one-piece coiled spring-like member in its actual manufactured form. The point of juncture of the ring elements 31 and 32 is defined by a slanted neck 33 which transforms the ring elements 31 and 32 into flat ring segments. This is particularly shown in the forms of the seals of Figs. 1 and 2.

In mounting the scrapper ring unit 30 in the seal 10 of Fig. 1, the radial outer side surfaces of the ring elements 31 and 32 are placed in engagement with the radial end margin of the axially extending portion 26 of the rigidifying ring-like member 23 and the overlapping radial side surface of the flat ring 27. Thus, the scrapper ring unit 30 is held between these opposing surfaces to properly position the same axially along the shaft or piston 13 in spaced relation to the sealing lip portion 15 of the seal 10. Still further, the outer periphery of the scrapper ring unit 30 is in engagement with the inner periphery of the body portion 14 near the radial end face of the same contacted by the flat ring 27. With this arrangement the scraper ring unit 30 is operationally backed up by resilient material and in the event of eccentric operation of the shaft or piston 13 the scraper ring unit 30 will continue efficient scraping action although its radial positioning within the housing 11 is changed. In other words, the scraper ring unit 30 will follow the shaft or piston 13 without an interruption in efficiency of scraping action. With the helical formation of the scraper ring unit 30 and the provision of free unattached ends to the ring segments 31 and 32, the unit 30 is resiliently expandable as is well known in the different forms of conventional scraper rings or piston rings. The scraper ring unit 30 may be formed from any suitable material depending upon the operating conditions to be encountered.

Figure 2:
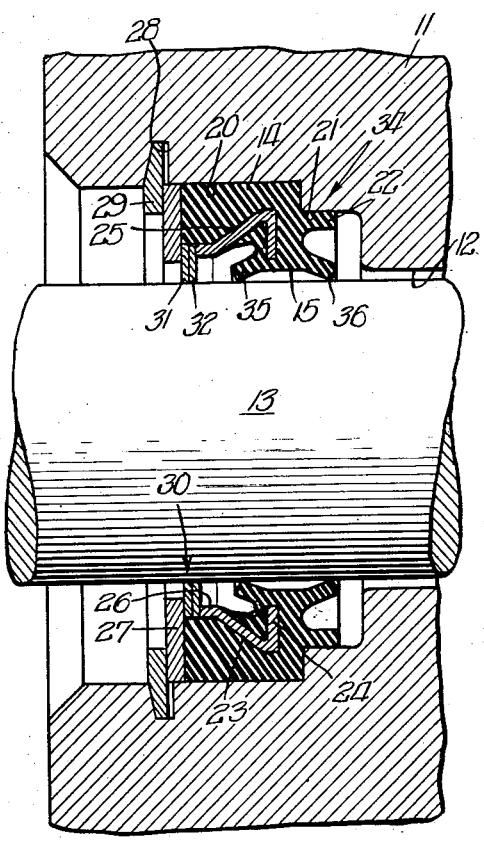
Fig. 2 is a view similar to Fig. 1 illustrating a modified form of the new and improved scraper seal of the present invention.
Figure 3:
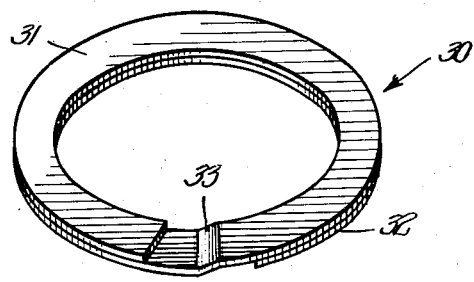
Fig. 3 is a perspective of the scraper ring unit utilized in the seals of Figs. 1 and 2.

In Fig. 2 a slightly modified scraper sealing unit 34 is illustrated in its mounted condition within the same environment as described in connection with Fig. 1. As substantially all of the elements forming the seal 34 are of the same structure and functional design as those described in connection with the seal 10, like reference numerals are used for these elements. The only difference between the seal 34 and the seal 10 is the use of two identical oppositely directed flexible sealing lips 35 and 36 in the former. The sealing lips 35 and 36 are similar to the sealing lips 16 of the unit 10 and do not have coil springs associated therewith but are individually capable, due to the properties of the rubber or rubber-like material from which they are formed, to provide the requisite resilient sealing action in association with the shaft or piston 13. The tight holding of the body portion 14 of the seal 34 against the shoulder defined between the bores 20 and 21 of the housing 11 provides the end of the body portion 14 in association with the sealing lip portion 15 with the requisite rigidity to allow the sealing lip 36 to function properly and maintain efficient sealing engagement with the shaft 13. Thus, with the particular design of the seals 10 and 34 it is not essential that the sealing lips 16, 17, 35 and 36 be spring loaded. However, one form of spring loading has been illustrated in connection with the lip 17 in order to illustrate the versatility of the seal of the present invention in the event that spring loading is considered either necessary or desirable.

As previously stated, the shaft or piston 13 may either reciprocate or combinedly reciprocate and rotate depending upon the type of operation imparted to the same. The seals 10 and 34 will function to prevent the escape of oil along the shaft or piston 13 while at the same time scrape the same to remove any deposits of carbonized oil or other foreign matter. The backing up of the scraper seal unit 30 by the resilient material of the body portion 14 allows the seals 10 and 34 to be efficiently used in association with eccentrically operating shafts. Still further, the rigidifying ring-like member 23 and the flat ring 27 provide more than single functions in that they additionally cooperate with one another to mount the scrapper ring unit 30 against axial displacement.

Obviously many modifications and variations of the invention as hereinbefore set forth may be made without departing from the spirit and scope thereof, and therefore only such limitations should be imposed as are indicated in the appended claims.

I claim:

1. A scraper seal for use with a reciprocating shaft, said seal including a sealing lip portion for resiliently engaging said shaft, cooperating seal positioning and rigidifying ring-like members associated with the body portion of said seal, and a resiliently expandable scraper ring unit formed from integrally connected non-continuous ring elements coiled upon one another the inner peripheries of which are adapted for resilient expandable engagement with said shaft, said ring unit being held along its radially directed side surfaces in operative position by opposing surfaces of said ring-like members.

2. A scraper seal for use with a reciprocating shaft, said seal including a sealing lip portion for resiliently engaging said shaft, cooperating seal positioning and rigidifying ring-like members associated with the body portion of said seal, and a resiliently expandable scraper ring unit formed from a helical segment of slightly less than two full tightly wound convolutions the inner peripheries of which are adapted for resilient expandable engagement with said shaft, said ring unit being held along its radially directed side surfaces in operative position by opposing surfaces of said ring-like members.

3. A scraper seal for use with a reciprocating shaft, said seal including a sealing lip portion for resiliently engaging said shaft, cooperating seal positioning and rigidifying ring-like members in engagement with the body portion of said seal, and a resiliently expandable scraper ring unit formed from integrally connected non-continuous ring elements coiled upon one another the inner peripheries of which are adapted for resilient expandable engagement with said shaft, said ring unit being held along its radially directed side surfaces in operative position by opposing surfaces of said ring-like members and being in contact along its outer periphery with the material of said seal.

4. A scraper seal for use with a reciprocating shaft, said seal including a sealing lip portion for resiliently engaging said shaft, cooperating seal positioning and rigidifying ring-like members in engagement with the body portion of said seal, and a resiliently expandable scraper ring unit formed from a helical segment of slightly less than two full tightly wound contacting convolutions the inner peripheries of which are adapted for resilient expandable engagement with said shaft, said ring unit being held along its radially directed side surfaces in operative position by opposing surfaces of said ring-like members and being in contact along its outer periphery with the material of said seal.

5. A scraper seal for use with a reciprocating shaft, said seal being formed from a radially acting sealing lip portion provided with oppositely directed flexible sealing lips for sealing said shaft, an axially extending body portion integral near one end thereof with said sealing lip portion, said sealing lip portion and body portion being formed from resiliently acting material, a rigidifying ring-like member having a radially inwardly directed portion imbedded in said body portion and said sealing lip portion and having an axially extending portion the radial end margin of which is exposed and which is positioned just short of the radial end margin of said body portion along the inner surface of said body portion, a radially directed flat ring held in contact with the radial end margin of said body portion and radially inwardly overlapping the same, and a resiliently expandable scraper ring unit held in radially acting relation between and by the radial end margin of said ring-like member and the radially inwardly overlapping side surface portion of said flat ring, said ring unit being formed from integrally connected non-continuous ring elements coiled upon one another to form tightly wound contacting convolutions, the outer periphery of said ring unit being in contact with said body portion.

6. A scraper seal for use with a reciprocating shaft, said seal being formed from a radially acting sealing lip portion provided with oppositely directed flexible sealing lips one of which is spring loaded for sealing said shaft, an axially extending body portion integral near one end thereof with said sealing lip portion, said sealing lip portion and body portion being formed from resiliently acting material, a rigidifying ring-like member having a radially inwardly directed portion imbedded in said body portion and said sealing lip portion and having an axially extending portion the radial end margin of which is exposed and which is positioned just short of the radial end margin of said body portion along the inner surface of said body portion, a radially directed flat ring held in contact with the radial end margin of said body portion and radially inwardly overlapping the same, and a resiliently expandable scraper ring unit held in radially acting relation between and by the radial end margin of said ring-like member and the radially inwardly overlapping side surface portion of said flat ring, said ring unit being formed from integrally connected non-continuous ring elements coiled upon one another in tightly wound contacting convolutions, the outer periphery of said ring unit being in contact with said body portion.

7. A scraper seal for use with a reciprocating shaft, said seal being formed from a radially acting sealing lip portion provided with oppositely directed flexible sealing lips for sealing said shaft, an axially extending body portion integral near one end thereof with said sealing lip portion, said sealing lip portion and body portion being formed from resiliently acting material, a rigidifying ring-like member having a radially inwardly directed portion imbedded in said body portion and said sealing lip portion and having an axially extending portion the radial end margin of which is exposed and which is positioned just short of the radial end margin of said body portion along the inner surface of said body portion, a radially directed flat ring held in contact with the radial end margin of said body portion and radially inwardly overlapping the same, and a resiliently expandable scraper ring unit held in radially acting relation between and by the radial end margin of said ring-like member and the radially inwardly overlapping side surface portion of said flat ring, said ring unit being formed from a helical segment of slightly less than two full tightly wound contacting convolutions, the inner peripheries of which are adapted for resilient expandable engagement with said shaft, the outer periphery of said ring unit being in contact with said body portion.

No references cited